UNITED STATES PATENT OFFICE.

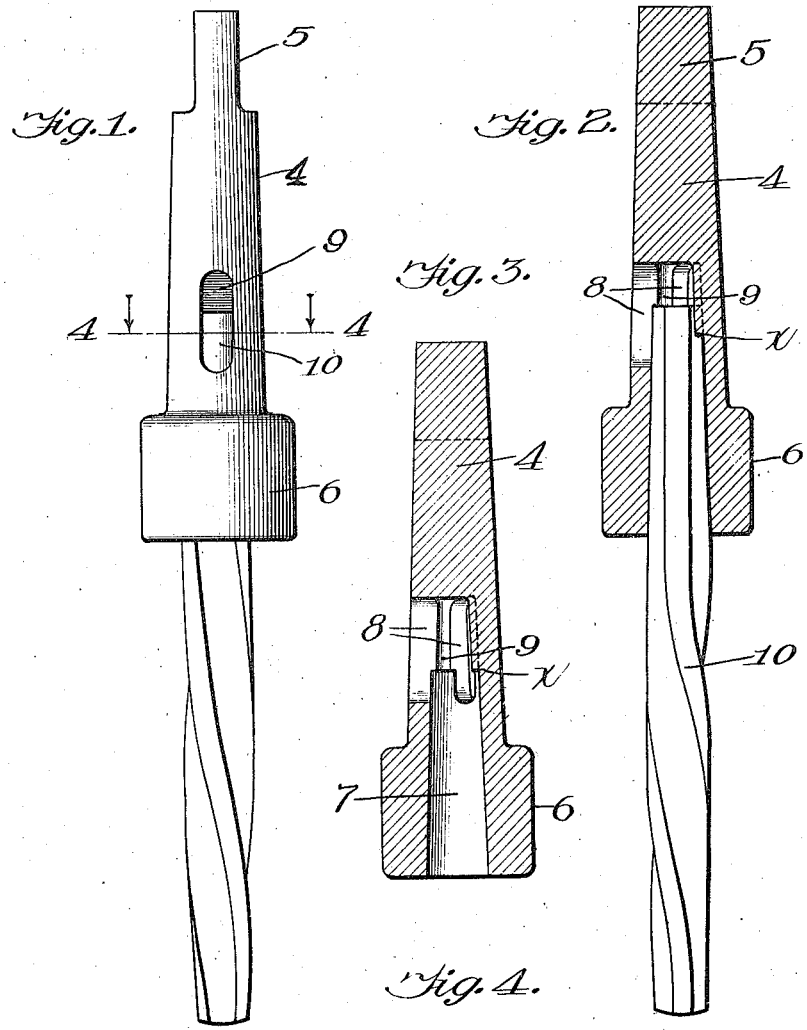

OSCAR FREDRICKSON, OF BUCHANAN, MICHIGAN, ASSIGNOR TO CELFOR TOOL COMPANY, OF CHICAGO, ILLINOIS, A CORPORATION OF ILLINOIS.

CHUCK FOR REAMERS, &c.

1,066,199.

Specification of Letters Patent.

Patented July 1, 1913.

Application filed February 20, 1908. Serial No. 416,913.

*To all whom it may concern:*

Be it known that I, OSCAR FREDRICKSON, a citizen of the United States, residing at Buchanan, in the county of Berrien and State of Michigan, have invented certain new and useful Improvements in Chucks for Reamers, &c., of which the following is a specification, reference being had to the accompanying drawings.

My invention relates to tool holders, and has for its object to provide a new and improved chuck for holding tapered boring tools, such as reamers, drills, etc., which will be cheaper in construction and more efficient in operation than those heretofore employed for the purpose. I accomplish this object as illustrated in the drawings and as hereinafter described.

What I regard as new is set forth in the claims.

In the drawings, Figure 1 is a side elevation of my improved chuck having reamer fitted therein; Fig. 2 is a longitudinal vertical section of the chuck showing also the reamer; Fig. 3 is a longitudinal sectional view of the chuck, the reamer being removed; and Fig. 4 is a cross-section on line 4—4 of Fig. 1.

As illustrated in the drawings, my improved chuck consists of a tapered body 4 having a tang 5 at its smaller end and a shoulder 6 at its larger end. The body of the chuck is designed to be applied to the ordinary sleeve socket commonly used in drill presses and other machine tools, which is usually provided with a recess at its inner end to receive the tang of the tool shank.

7 indicates a socket formed in the chuck body 4 extending from the larger end inward, said socket being tapered to conform to the taper of the tool shank.

8 indicates a series—preferably three—of transverse slots in the body 4, which intersect the recess 7 at its inner end, as shown in Figs. 3 and 4.

9 indicates internally-projecting lugs or ribs formed in the recess 7 at its inner end. As shown in Figs. 2 and 3, the slots 8 extend somewhat nearer the larger end of the chuck than the lugs 9. This is due to the fact that said lugs are formed when the body of the chuck is bored out to form the recess 7, the main bore being carried to the point X in Figs. 2 and 3, a bore of reduced diameter being thence extended to the bottom of the socket. The transverse slots 8 are then cut, leaving the lugs 9 as they are shown in the drawings. The purpose of the lugs 9 is to fit in the grooves or channels in the reamer 10, which, in the form shown, is provided with three of such grooves or channels, as best shown in Fig. 4. The diameter of the shank of the reamer is such that it does not extend into the chuck much beyond the lower or outer ends of the lugs 9, at least not beyond the inner ends of the transverse slots 8 which are provided so that a tool may be inserted through said slots to force the reamer outward and detach it from the chuck. The lugs 9 serve to hold the reamer or the tool against rotation in the socket of the chuck, and the reamer is further held in said socket by the close fitting of its shank in the tapered recess 7.

By the use of my improved chuck, reamers or drills, or other similar tools, unprovided with enlarged shanks may be readily fitted to the sleeve sockets of machine tools since the tool may be held firmly by my improved chuck while the chuck itself is applied to the sleeve socket of the machine tool. My improved chuck may, of course, be used independently of a machine tool, if desired.

That which I claim as my invention, and desire to secure by Letters Patent, is,—

1. A chuck for reamers, etc., comprising a body having a socket to receive the shank of the tool, and a cylindrical bore of reduced diameter at the inner end of said socket, said bore being intersected by transverse slots, forming integral lugs.

2. A chuck for reamers, etc., comprising a body having a socket to receive the shank of the tool, and a cylindrical bore of reduced diameter at the inner end of said socket, said bore and the inner portion of the socket being intersected by transverse slots, forming integral lugs.

3. A chuck for reamers, etc., comprising a body having a tapered socket to receive the shank of the tool, and a cylindrical bore of reduced diameter at the inner end of said socket, said bore being intersected by transverse slots, forming integral lugs.

4. A chuck for reamers, etc., comprising a body having a tapered socket to receive the shank of the tool, and a cylindrical bore of reduced diameter at the inner end of said socket, said bore being intersected by three equidistant transverse slots, forming segmental lugs.

OSCAR FREDRICKSON.

Witnesses:
M. A. HANLIN,
GLENN E. SMITH.